July 11, 1933.  B. W. TWYMAN  1,918,219
BRAKE TESTING APPARATUS
Filed Dec. 19, 1929
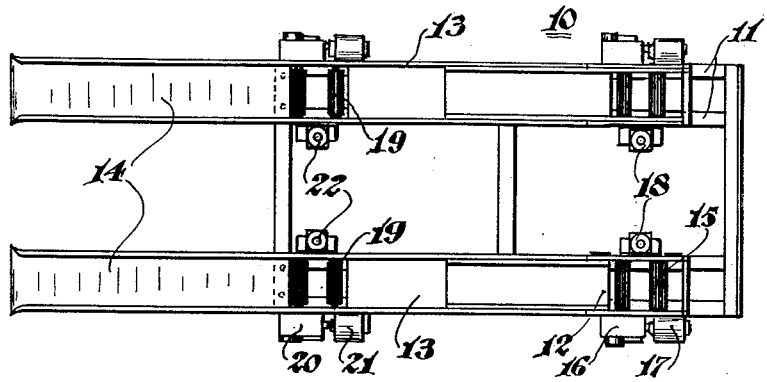
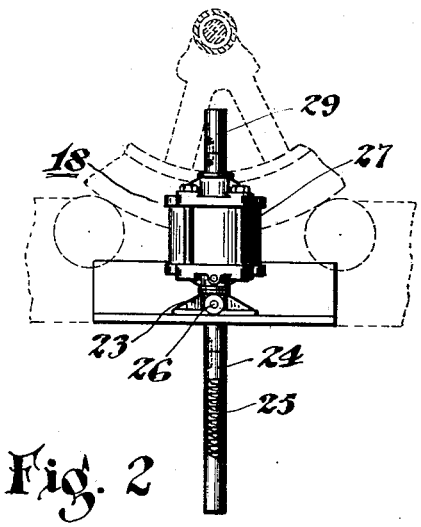
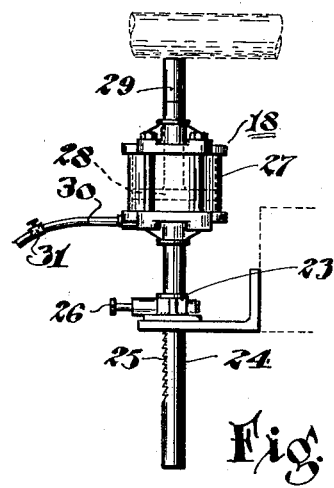
INVENTOR.
B. Wickliffe Twyman
BY
ATTORNEY Patented July 11, 1933

1,918,219

UNITED STATES PATENT OFFICE

B. WICKLIFFE TWYMAN, OF SOUTH BEND, INDIANA

BRAKE TESTING APPARATUS

Application filed December 19, 1929. Serial No. 415,173.

This invention relates to brake testing machines and more particularly to such machines having means associated therewith for elevating a motor vehicle when in position on the machine.

An object of the invention is to provide a brake testing machine having jacks for elevating one or all of the wheels of a motor vehicle when positioned on the machine.

Another object of the invention is to provide a brake testing machine comprising a fixed and a movable carriage and jacks supported on each of the carriages for elevating a motor vehicle when in position on the machine.

Another object of the invention is to provide a brake testing machine comprising fixed and movable carriages each having rollers arranged in pairs adapted to support the wheels of a motor vehicle and jacks positioned adjacent to each pair of rollers for elevating either one or all of the wheels of the vehicle.

A further object of the invention is to provide a brake testing machine comprising a fixed and a movable carriage each having rollers arranged thereon in pairs with brake testing devices operatively connected to the respective pairs of rollers and jacks associated with each pair of rollers for elevating either one or all of the wheels of a motor vehicle positioned on the machine.

With these and other objects in view which may be instant to the improvements, the invention consists in the parts and combination of parts to be hereinafter set forth and claimed, with the understanding that the several necessary elements comprising the invention may be varied in construction, proportion and arrangement without departing from the spirit and scope of the appended claims.

In order to make the invention more clearly understood, I have shown in the accompanying drawing, means for carrying the same into practical effect without limiting the improvements in their useful applications to the particular construction, which for the purpose of explanation, has been made the subject of illustration.

In the drawing forming a part of this specification:

Figure 1 is a top plan view of a four wheel brake testing machine embodying the invention;

Figure 2 is a side elevation of the jack in a lowered position; and

Figure 3 is a side elevation of the jack in a raised position.

Referring by numerals to the drawing, 10 represents generally a brake testing machine. This machine has a plurality of double tracks 11 upon which is mounted a movable carriage 12 and a fixed carriage 13. As shown, the fixed carriage has secured thereto suitable ramps 14.

The movable carriage is provided with oppositely disposed sets of rollers 15 operatively connected to a brake testing device 16 driven by a suitable motor 17. The testing devices and motors are carried by the movable carriage and suitably supported on the carriage are oppositely disposed jacks 18 positioned adjacent to each set of rollers.

The fixed carriage is provided with oppositely disposed sets of rollers 19 each operatable through a brake testing device 20 driven by a motor 21 and arranged adjacent to each set of rollers is a jack 22.

The relative position of the jacks 18 and 22 to the respective sets of rollers 15 and 19 is such that when a motor vehicle is supported on the rollers the jacks will be positioned in vertical planes extending through the axes of the axles of the vehicle on which the wheels are mounted.

The jacks are pneumatically operated. As shown, the jacks on both the movable and fixed carriages are each provided with a base 23 in which is positioned a vertical movable member 24 provided with a ratchet 25 adapted to be engaged by a spring pressed pawl or plunger, not shown, but mounted in the base 23 and adapted to be released by the pull or knob 26.

Supported on the top of the member 24 is a cylinder 27 in which is positioned for reciprocation a piston 28 having a rod 29 adapted to engage the axle of a motor vehicle, and connected to the cylinder 27 is a pipe line 30 leading to a suitable source of compressed air, not shown, and positioned in the pipe line is a suitable valve 31 for controlling the air supplied.

When a motor vehicle, the brakes of which are to be tested, is placed in position on the machine, it is driven under its own power up the ramps 14, the front wheels overriding the fixed carriage and the movable carriage 12 until they engage the rollers 15. Further forward movement of the vehicle carries forward the movable carriage until the back wheels of the vehicle are positioned between the set of rollers 19. The machine is then in proper position for testing the brakes.

In testing the brakes, should it become advisable or essential to remove a wheel from the vehicle to correct some defect or to perfect some adjustment, the jack immediately adjacent that particular wheel is raised until the plunger 29 engages the axle of the vehicle on which the wheel is mounted. The jack is retained in the elevated position by a pawl engaging the ratchet 25. With the jack in this position air is admitted under pressure to the cylinder 27. This actuates the piston 29 and causes it to move upwardly and to carry with it the rod 29 engaging the motor vehicle axle. After the braking elements have been assembled and the wheel is replaced, the pipe line is removed and the air is dispelled in the jack by the weight of the vehicle.

While the preferred embodiments of the invention have been described, it is to be understood that these are given merely as examples of the underlying principles of the invention, and since these may be incorporated in other specific mechanical structures, I do not intend to be limited to those shown except as such limitations are clearly imposed by the appended claims.

I claim:

1. A brake tester unit for an individual wheel, a plurality of said units being adapted to be used in a set as desired, each unit comprising a carriage, spaced rollers arranged on the carriage for supporting a wheel of a vehicle, a brake testing device connected to the rollers, a motor for operating the brake testing device, and a jack on the carriage.

2. As an article of manufacture a brake testing unit for an individual vehicle wheel, a plurality of said units being adapted to be used in a set as desired, each unit comprising a carriage, rollers arranged in spaced relation on the carriage, a brake testing device connected to the rollers, a motor for operating the brake testing device, and a jack on the carriage positioned in a vertical plane between the rollers.

3. A machine for testing the brakes of a motor vehicle comprising two fixed brake testing units and two movable units, each unit comprising a carriage including a pair of rollers for supporting a wheel of a vehicle, a brake testing device operatively connected to the rollers, a motor for each brake testing device, and a jack on each carriage positioned in a plane between the rollers.

In testimony whereof, I have hereunto signed my name.

B. WICKLIFFE TWYMAN.